United States Patent [19]
Hulst

[11] 3,722,047
[45] Mar. 27, 1973

[54] HIGH CHAIR FORMING APPARATUS

[76] Inventor: Raymond H. Hulst, Rte. 1, Hamilton, Mich. 49505

[22] Filed: Oct. 18, 1971

[21] Appl. No.: 190,088

[52] U.S. Cl. ............... 29/34 D, 29/33 F, 29/33 K, 29/208 F
[51] Int. Cl. ............... B21f 15/08, B21f 45/00
[58] Field of Search ........ 29/208 F, 33 K, 33 F, 34 R, 29/34 D

[56] References Cited

FOREIGN PATENTS OR APPLICATIONS

766,425  1/1957  Great Britain ........................... 29/34

*Primary Examiner*—Francis S. Husar
*Attorney*—John E. McGarry

[57] ABSTRACT

An apparatus for forming support members for reinforcing rods. A pair of crossed wires are cut and bent into a U-shape and thereafter retained in a concave cavity of the forming die which is rotated about a rotary turret to a weld station at which the crossed wires are welded together. The welded U-shaped wires are then transferred in the die to a capping mechanism or to an end bending mechanism. The capping mechanism applies caps to the ends of the wires. The end bending mechanism bends the ends of the wires upwardly. The capping mechanisms and the end bending mechanism are adjustable to accommodate wires of different lengths for making support members of different heights.

21 Claims, 21 Drawing Figures

FIG. 12A

HIGH CHAIR FORMING APPARATUS

BACKGROUND OF THE INVENTION

Field of the Invention

This invention relates to an apparatus for forming supports for reinforcing rods. In one of its aspects, it relates to an apparatus for forming high chair supports, the apparatus having means for bending a pair of crossed wires in a die so that the wires are retained in the die, means for moving the die to a welding station wherein the crossed members are welded, and means for finishing the ends of the wires by placing caps on the wires or turning up the ends of the wires.

BACKGROUND OF THE INVENTION

In the construction industry, "high chairs" are well known supports for reinforcing rods and are used in concrete forms for supporting and positioning reinforcing rods in molds before and during the pouring of the concrete. The high chairs are formed from a pair of inverted U-shaped wires which are crossed and welded at the bight portions thereof. One of the U-shaped wires has an indented bight portion for reception of the reinforcing rods as the wire stands on its ends. When ceilings or similar structures are poured and the bottom of the concrete will be an exposed surface, the bottom of the high chairs must be capped with a plastic cap to prevent staining of the exposed bottom surface due to rusting of the bottom ends of the wires. When the bottom surface of the concrete will not be exposed, the ends of the wires must be turned up. The height of the high chairs will depend on the desired position of the reinforcing rods within the concrete form. Different sizes are required for different jobs.

Presently, high chairs are made by cutting lengths of wire and separately forming each wire into a U-shape. Pairs of wires are assembled and welded together. The ends of the welded wires are capped or turned up in separate operations. Each operation requires a separate handling of the wires and accordingly requires considerable labor.

BRIEF STATEMENT OF THE INVENTION

According to the invention, an apparatus is provided for forming high chairs in a completely automated operation. The apparatus has means for bending a pair of crossed wires into a U-shape, the bending means including a die member having a concave cavity for retaining the U-shaped wires, crossed at the bight portions thereof. Welding means, including a welding electrode, weld the U-shaped wires together at the crossed bight portions while the wires are positioned in the die member. Cap applying means apply caps to the end of the U-shaped wires within the die member, or end bending means bend the ends of the wires upwardly, depending on which type of high chair is being made. Means move the die members containing the U-shaped wires from the bending means, to the welding means and to the capping or end bending means successively so that the high chair is completely formed before it leaves the die. Means are further provided for removing the welded and capped or bent end wires from the die member after the operations are complete.

In addition, adjustable means cut the wires to a desired length from wire stock at the bending means before bending the wires into the U-shapes. The cutting means, as well as the cap applying means and the end bending means are adjustable for forming high chairs or supports of different heights.

BRIEF DESCRIPTION OF THE DRAWINGS

The invention will now be described with reference to the accompanying drawings in which.

DETAILED DESCRIPTION OF THE PREFERRED EMBODIMENT

General Description

Figure 1:
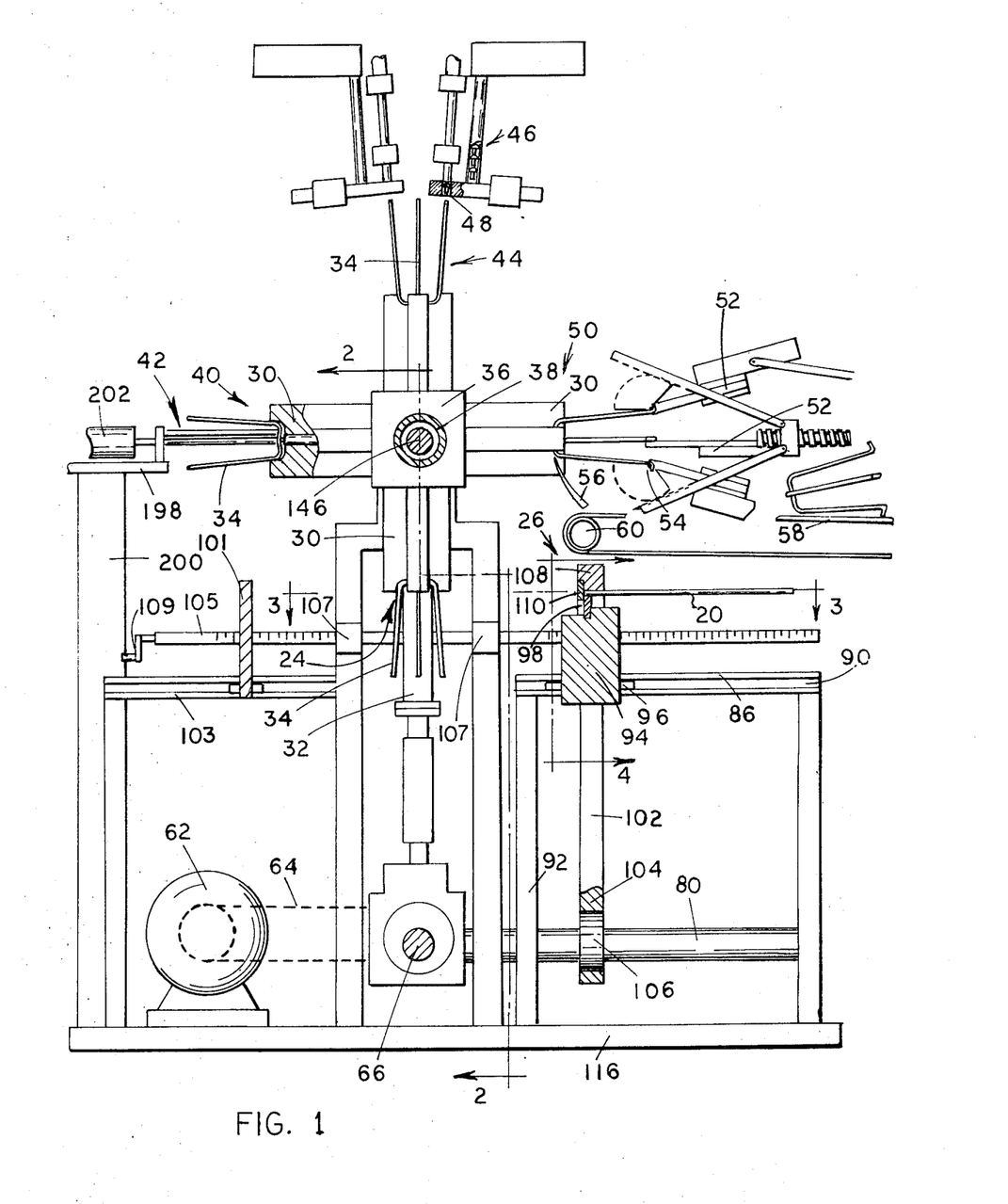
FIG. 1 is a schematic front elevational view of a machine according to the invention and seen generally along lines 1—1 of FIGS. 2 and 3.
Figure 2:
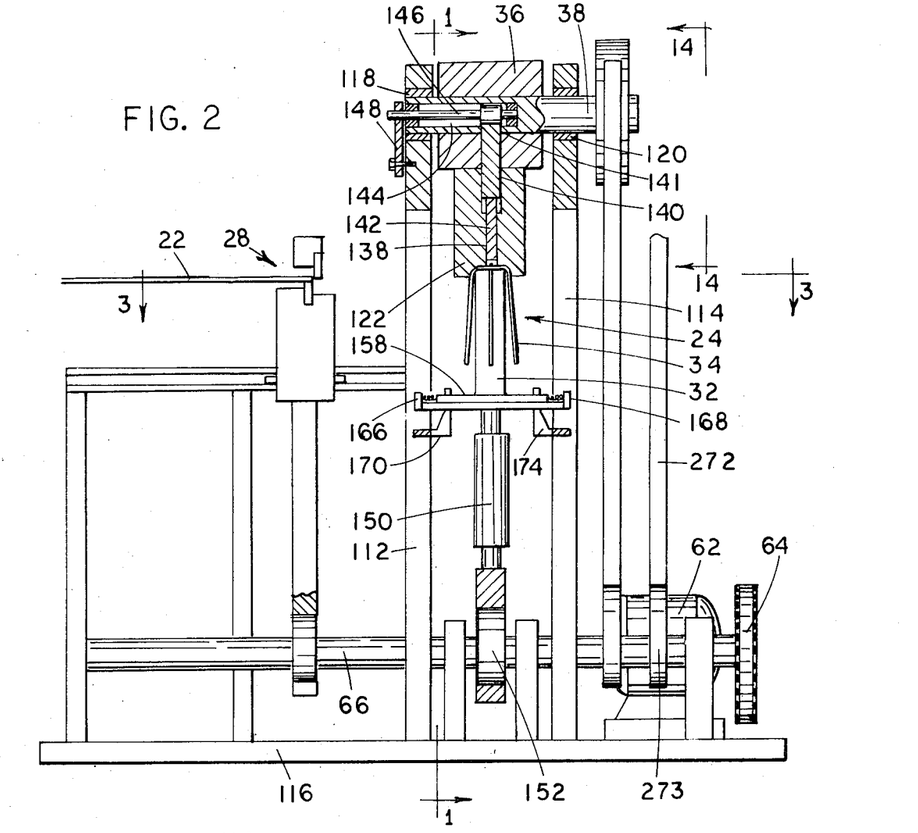
FIG. 2 is a partial side elevational view along lines 2—2 of FIG. 1.
Figure 3:
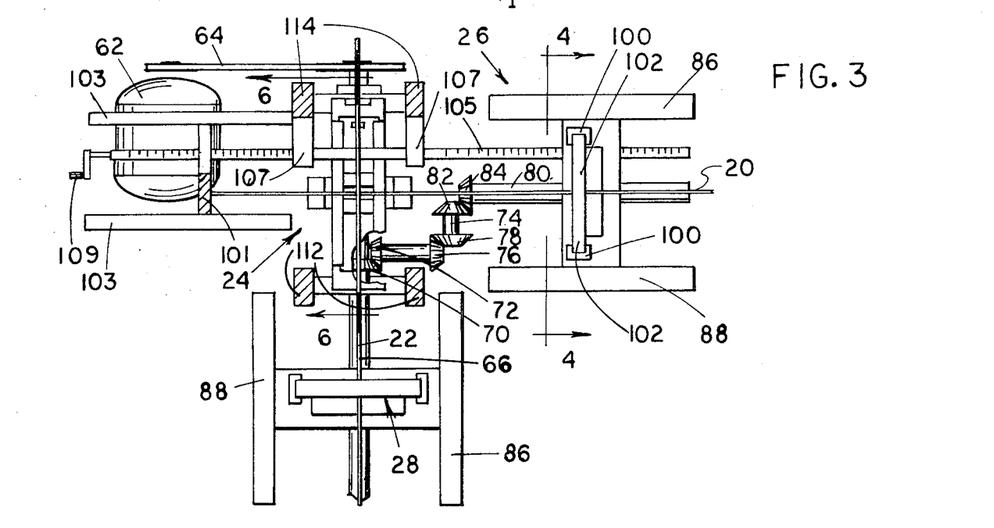
FIG. 3 is a plan view in section, taken along lines 3—3 of FIG. 2.

Referring now to the drawings, and to FIGS. 1 through 3 in particular, there is illustrated a high chair forming apparatus in which wire stock 20 and 22 are fed at right angles to each other by means (not shown) to a bending station 24. A first cut off mechanism 26 severs the wire stock 20 and a second cut off mechanism 28 severs the wire stock 22. As the wires are severed, a male die member 32 is forced upwardly and forces the two severed wires into a holding and forming die 30 having a concave cavity which forms U-shaped wires 34 therein. The wires 34 are crossed at right angles to each other in the die 30. Four such holding and forming dies 30 are arranged at 90° intervals about a die block 36 which is fixed to a rotary shaft 38. The dies are rotated on the shaft 38 in a clockwise direction as viewed in FIG. 1. As the male die member 32 is lowered, the dies 30 are rotated with the U-shaped wires passing successively from the bending station 24 to a welding station 40, to a capping station 44 and to an end or toe bending station 50. At the welding station 40, a weld gun 42 advances to weld the crossed wires together. At the capping station 42, caps 48 are fed from a cap feeding mechanism 46 and applied to the ends of the wires 34. At the toe bending station 50 the ends of the U-shaped wires are bent upwardly forming bent ends 54 by a toe bending apparatus 52. as the die 36 As from the toe bending station back to the bending station 24, the finished high chairs are ejected from the holding and forming die 30 by ejecting rails 56. A conveyor belt 58 having a roller 60 is positioned at the bottom of the ejecting rails 56 for receiving the ejected high chairs and carrying them away from the machine.

The machine is adapted to form one of two types of high chairs. The first type of high chair is the high chair with caps 48 on the ends thereof and the second high chair is the high chair without the caps but with the toes 54 bent upwardly. When the capping operation is functioning, the toe bending operation is dormant. Conversely, when the toe bending apparatus is functioning, the capping operation is not functioning.

The power for the machine is supplied by a motor 62 through a power shaft 66 and through a drive belt 64. A power take off shaft 68 is mechanically coupled to the power shaft 66 through bevel gears 70 and 72. Similarly, shaft 74 is mechanically coupled by bevel gears 76 and 78 and auxiliary power shaft 80 is coupled to the shaft 74 through bevel gears 82 and 84. Other suitable mechanical arrangements can be provided to power the auxiliary power shaft 80. The take off shafts 68, 74, and the auxiliary power shaft 80 are all conventionally supported for rotation by means (not shown).

Cut Off Mechanism

Figure 4:
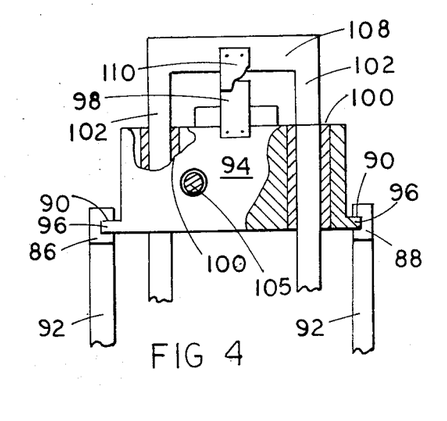
FIG. 4 is an enlarged partial side view of the cut off mechanism seen along lines 4—4 of FIG. 3.
Figure 5:
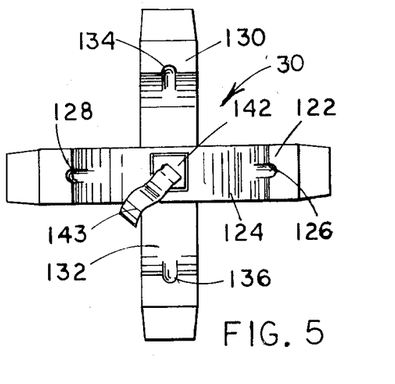
FIG. 5 is an enlarged plan view of the holding die.

Reference is now made to FIGS. 1, 3, and 4 for a description of the cut off mechanism. Both cut off mechanisms 26 and 28 are identical and, for the sake of brevity, only one such mechanism will be described. Each cut off mechanism comprises a pair of spaced horizontal gibs 86 and 88 having side slots 90 opening therein. These gibs 86 and 88 are supported by upright members 92. A cross member 94 has keys 96 which slide within the slots 90 of the gibs 86. The cross member 94 has mounted at a top portion thereof a fixed cutter edge 98. A pair of vertical holes 100 are provided in the cross member 94 for drive rods 102 which are slidable therein. The drive rods 102 are connected at the bottom by a cross member 104. A circular opening in the cross member 104 surrounds a cam 106 which is keyed to the auxiliary power shaft 80. The drive rods 102 are connected at the top portion thereof by a cross member 108 which mounts a movable shear plate 110. The fixed cutter edge 98 mates with the movable shear plate 110 to shear the wire therebetween. A stop member 101 is provided in the line of the wire 20 to limit the movement of the wire 20 past the bending station 24 so that equal lengths of wire are provided on either side of the bending station 24. The stop member is supported for lateral movement toward and away from the bending station 24 by a pair of guides 103. A threaded bore in the stop 101 threadably engages a rod 105 which has opposite pitched threads at the ends. The rod is journalled in supports 107 which are secured to upright members 114. The opposite end of the rod 105 threadably engages a threaded bore of the cross member 94. A crank 109 is secured to the end of rod 105 for rotation of the rod 105. A similar stop mechanism for wire 22 is also desirably provided for synchronized movement with cut off mechanism 26. For purposes of simplicity, the second stop mechanism has not been shown in the drawings.

The cut off mechanisms 26 and 28 operate as follows: Shaft 80 is rotatably driven through the mechanical power connection to the power shaft 66. As shaft 80 rotates, the eccentric cam 106 causes reciprocation of the vertical drive rods 102. When the drive rods are positioned in the up position, the movable shear plate 110 is spaced upwardly of the fixed cutter edge 98 to permit passage of the wire stock 20 therethrough. After the wire stock is properly positioned at the bending station, and before the bending operation commences, the drive rods 102 are pulled downwardly to shear the wire stock between the movable shear plate 110 and the fixed cutter edge 98. After the forming operation on the severed rods at the forming station 24, the drive rods are again raised by the cam to permit passage of more wire stock through the cut off mechanism.

The length of the wires fed into the bending station 24 can be adjusted by rotating rod 105 to move the cut off mechanism along the gibs 86, with the keys 96 sliding in the slots 90. Cam 106 is keyed to the power shaft 80 and slides along the power shaft 80 following the movement of the cut off mechanism. Thus, movement of the cut off mechanism on the gibs 86 toward the bending station 24 will shorten the wires and movement of the cut off mechanism in the other direction will lengthen the wires. The stop 191 is simultaneously adjusted by rotation of rod 105 so that the wire fed to the bending station 24 has equal lengths on either side of the forming die 30. In this manner, the lengths of the legs of the high chairs formed during the bending operation will be equal.

Bending Mechanism

Reference is now made to FIGS. 1, 2, 5, 6, and 7 for a description of the apparatus used in bending the wires into the U-shaped form. As disclosed above, the holding and forming dies 30 are mounted on a rotary shaft 38 for rotation about a horizontal axis. The rotary shaft 38 is journalled into two upright members 112 and 114. Each of the upright members has a pair of upstanding legs on either side of the power shaft 66 which are joined at upper portions by a central support member. The rotary shaft 38 is journalled in bearings 118 and 120 in the upright support members 112 and 114.

The holding and forming die 30 is formed by a plate 122 having an upper U-shaped surface 124 for forming the Uvshaped wire 24 from the wire stock 22. The plate 120 has wire positioning indentations 126 and 128 (FIG. 5) at upper portions of the U-shaped end surface 124 for retaining and positioning the U-shaped wires 34. Side plates 130 and 132 are joined perpendicular to the plate 122 and have concave upper surfaces for forming the other U-shaped wire from the wire stock 20. Wire positioning indentations 134 and 136 are provided in the top portions of the side plates 130 and 132 respectively to position and hold the U-shaped wires after they are formed by the holding and forming die 30. Normally, the depth of the cavity of the die 30 will be sufficient to retain the U-shaped wire therein.

As illustrated in FIG. 2, the plate 122 has a vertical bore 138 which communicates with a bore 140 in the die block 36. A bore 141 in the rotary shaft 38 is aligned with bore 140 and 138 for receiving a push rod 142. A welding tab 143 extends from the push rod 142 between plate 122 and side plate 132 for use during the welding operation which will be described later.

The rotary shaft 38 has an axial bore 144 in which a stationary cam shaft 146 is positioned. A clamp 148 is fixed to the cam shaft 146 and to the upright support member 112 to retain the cam shaft 146 in a fixed position within the rotary shaft 38. The push rod 144 extends between the fixed cam shaft 146 and the U-shaped end surface 124 of the plate 122.

Figures 6, 7, 9, 9A, 9B:
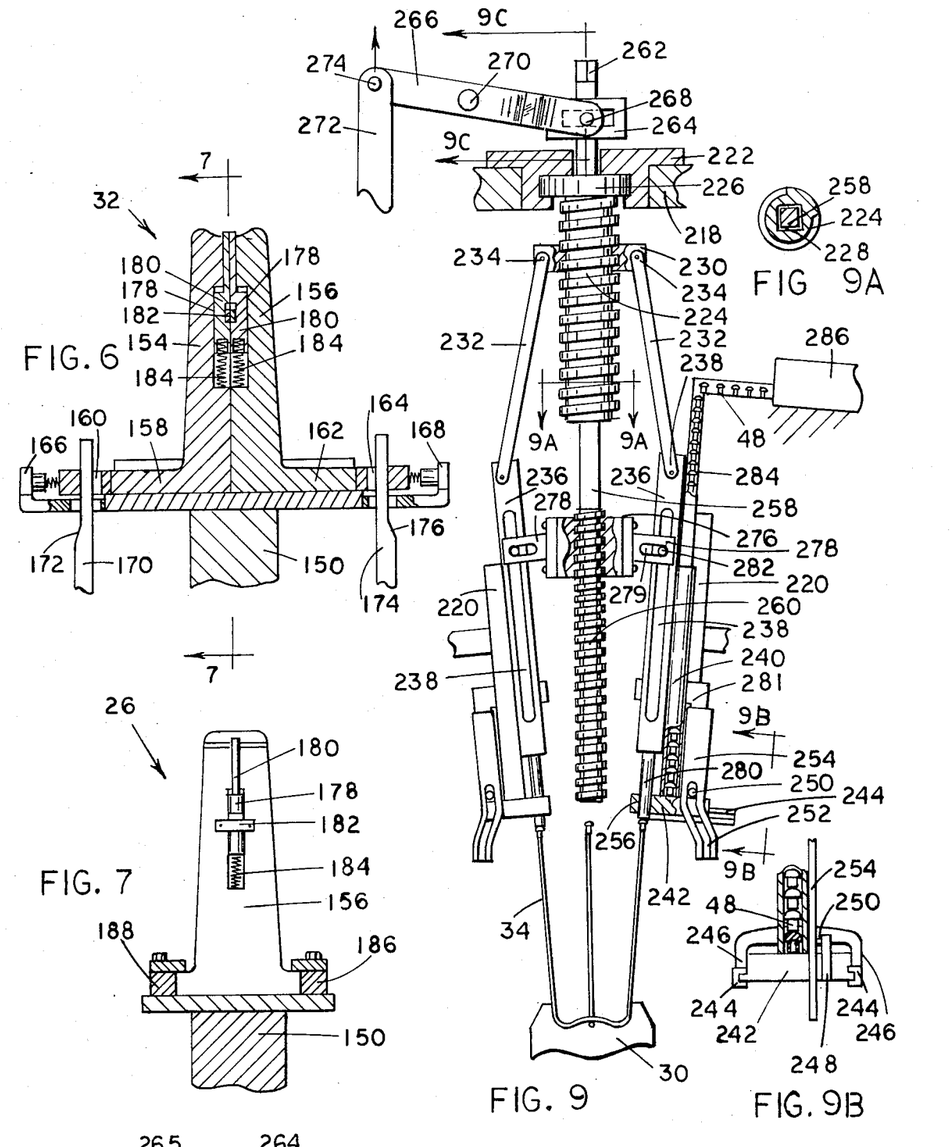
FIG. 6 is an enlarged cross sectional view of the male die member taken along lines 6—6 of FIG. 3.
FIG. 7 is an enlarged sectional view of the male die member seen along lines 7—7 of FIG. 6.
FIG. 9 is an enlarged front view, partly in section, of the capping apparatus.
FIG. 9A is a partial sectional view along lines 9A—9A of FIG. 9.
FIG. 9B is a partial sectional view along lines 9B—9B of FIG. 9.

The male die member 32 is supported by a connecting rod 150 which engages a cam 152 on the power shaft 66. As seen in FIGS. 6 and 7, the male die member 32 is formed from a pair of die halves 154 and 156 which have outwardly extending base flanges 158 and 162 respectively. A fixed cam plate 170 is secured between the upright members 112 and 114 at one side thereof. An opening 160 in the base flanges 158 receives the cam plate 170. Likewise, fixed cam plate 174 having an inclined cam surface 176 is supported between the other side of the upright members 112 and 114. An opening 164 in the base flange 162 receives the cam plate 176. Spring biasing members 166 and 168 are secured to the upper portion of the connecting rod 150 and have springs which bias the die halves 154 and 156 into the closed position illustrated in FIG. 6. Each of the die halves 154 and 156 has a cavity 178 which mounts a push member 180 within the cavity 178. A spring 184 biases the push member upwardly so that the top portion of the push member extends above the upper forming surface of the die member.

The forming operation works as follows: The wire stock having been cut by the cut off mechanism 26 and 28, are positioned at right angles to each other between the forming die 30 and the male die member 32. As the power shaft 66 turns, cam 152 raises the connecting rod 150 so that the male die member 32 is pushed into the holding and forming die with the wires therebetween. During this operation, the wires are bent into the U-shapes as they are forced into the holding and forming die 30. Simultaneously, the wire pushes the push members 180 down into the die halves 154 and 156 of the die member 32. As the power shaft continues to turn, the cam 152 draws the male die member 32 downwardly with the die halves 154 and 156 riding down the fixed cam plates 170 and 174. As the inclined cam surfaces 172 and 176 contact the flanges 158 and 162, the die halves 154 and 156 are spread apart. Guides 186 and 188 are provided on either side of each of the die members 154 and 156 to guide the lateral movement of the die halves. During the downward movement of the die halves 154 and 156, the push members 180 push against the base of the wires in the holding die until the die halves 154 and 156 are frictionally disengaged from the wire rods. This action of the push members 180 retains the U-shaped wires 34 within the holding and forming die 30 as the male die member 32 is withdrawn.

During the downward movement of the male die member 32, the holding and forming dies 30 are rotated through an angle of 90° on the rotary shaft 38. Normally, the one end of the bent wires 34 would strike the male die member 32 during the rotation of the wires from the bending station 24 to the welding station 40. However, the separation of the die halves 154 and 156, as described above, permits the end of the wires to pass between these die halves as it moves from the bending station 24 to the welding station 40.

Welding Mechanism

Figures 8, 8A:
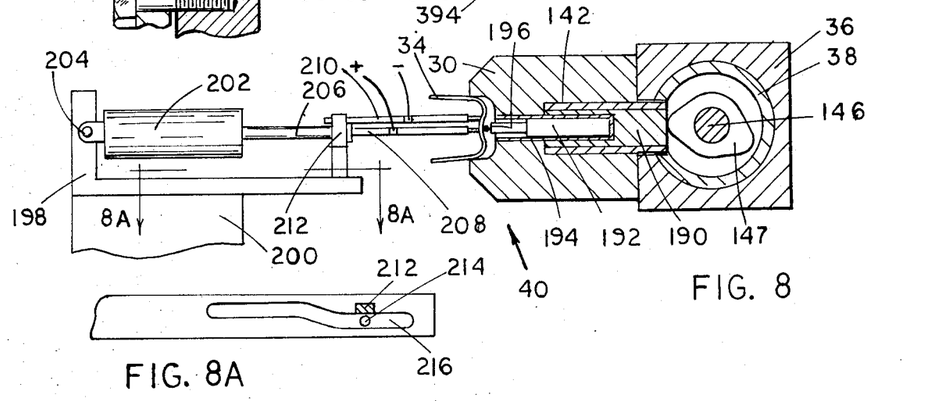
FIG. 8 is an enlarged front view, partly in section, of the welding apparatus.
FIG. 8A is a partial view along lines 8A—8A of FIG. 8.

Reference is now made to FIGS. 8 and 8A for a description of the welding station 40. As seen in FIG. 4, the push rod 142 comprises a holder 190 and a rod 192 separated by an insulated sleeve 194. The bottom of the holder 190 bears against a cam 147 which is fixed to the stationary cam shaft 146. The cam 147 has a lobe aligned with the welding station 40 to push the push rod 142 outwardly. An alkanite tip 196 is fixed to the outer end of the rod 192. As illustrated in FIG. 8, the rotation of the die 30 to the welding station causes the push rod assembly 142 to be pushed outwardly, thereby raising the U-shaped wires 34 within the holding die 30. The welding tab 143 (FIG. 5) is fixed to the top of the alkanite tip and is also pushed outwardly as the push rod assembly 142 is moved out by the cam 147.

The welding assembly is supported on a bracket 198 by vertical supports 200. An air cylinder 202 is pivotably attached at its back end through pin 204 to the bracket 198. The piston rod 206 of the cylinder 202 is secured to a welding electrode 208 and a grounding shank 210 through an insulated clip 212. A guide pin 214 is secured to a bottom portion of the clip 212 and rides in a cam slot 216.

The welding operation takes place as follows: As the die 30 is rotated to the welding station 40, the cam lobe on the cam 147 pushes the push rod assembly outwardly, thereby forcing U-shaped rods 34 out slightly from the bottom of the holding die 30. At this time, the U-shaped wires are still wedged between the inner edges of the die 30 and are still retained thereby. Simultaneously with the rotation of the welding station 40, the air cylinder 202 has air introduced into its back end by means of a cam operated valve (not shown), thereby extending the piston rod 206 and forcing the welding electrode 208 into contact with the junction of the two U-shaped wires 34. The grounding shank 210 is at the same time forced into contact with the welding tab 143, thereby making an electrical circuit between the welding electrode 208, crossed U-shaped wires 34, the welding tab 143 and the ground electrode 210. In this manner, the two U-shaped wires are welded together.

As the die members 30 are rotated about the rotary shaft 38, the U-shaped wires 34 in the plane of rotation would tend to hit the welding electrode 208. However, the cam slot 216 guides the electrode out of the path of the rotating U-shaped wires 34 as the electrode is withdrawn. Similarly, the electrode 208 remains out of the path of the U-shaped wire 34 as the die 30 rotates to the welding station 40. As the welding electrode 208 and the grounding shank 210 are moved in toward the holding die 30 for the welding operation, the cam slot 216 guides the pin 214 so that the welding electrode 208 is positioned in the proper relationship for contacting the crossed U-shaped wires 34.

Cap Feeding Mechanism

Reference is now made to FIGS. 9, 9A, 9B, and 9C for a description of the cap feeding mechanism 46. As discussed above, the cap feeding mechanism places plastic caps 48 on each of the ends of the U-shaped wires 34. The cap feeding mechanism 46 is supported by an upper support member 218 and side guide members 220. The support members 218 are fixed to vertical supports (not shown) and remain fixed with respect to the other fixed parts of the apparatus. A support collar 222 is supported by the upper support member 218 and rotatably supports a threaded guide support shaft 224 through a ring 226 which is fixed to the upper end of the support shaft 224. The support shaft 224 has a square bore 228 as illustrated in FIG. 9A.

Spaced about the support shaft 224 are four separate cap feeding devices, each of which feeds a cap to one end of a U-shaped wire. For purposes of simplicity, only two such mechanisms have been illustrated in FIG. 9, and for purposes of brevity, only one such mechanism will be described. It is to be understood, however, that there are four identical mechanisms spaced about the support shaft 224 and moved in unison.

A threaded collar 230 threadably engages the support shaft 224 and supports a plurality of connecting links 232 through a pin 234. A guide member 236 is joined to the bottom of the connecting link 232 through a pin 237. Guide member 236 is slidably retained by a fixed side guide member 220. A vertical guide slot 238 is positioned in the guide member 236. A hollow cap tube 240 for feeding the caps 48 is secured to the guide member 236 and is movable therewith. Reciprocably supported beneath the hollow cap tube 240 on side rails 244 is a cap positioning block 242 having a cap guide opening 256. Rails 244 are secured to the hollow cap tube 240 through side supports 246. As illustrated in FIG. 9B, a cam follower 248 is fixed to one side of block 242 and has a pin 250 which rides in a cam track 252 of a cam member 254.

Figure 9C:
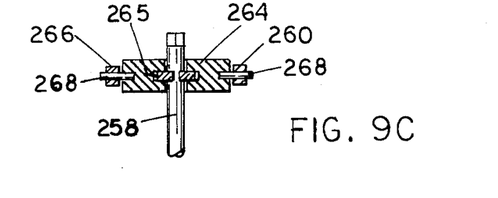
FIG. 9C is a partial sectional view along lines 9C—9C of FIG. 9.

A spline shaft 258 is mounted for reciprocation within the square bore 228 of the support shaft 224. The spline shaft 258 has a lower threaded end 260 and a squared upper end 262. A yoke 266, pivotably mounted on pivot pin 270, rotatably supports the spline shaft 258 through an annular ring 264 which is pinned to the arms of the yoke through pins 268. The spline shaft 258 has an inner ring 265 secured to the upper end thereof. The ring 265 engages and rotates within the annular ring 264 as illustrated in FIG. 9C. The spline shaft 258 is thus free to rotate about its longitudinal axis with respect to the yoke 266. A drive link 272 is secured to the other end of the yoke 266 through a pin 274. The drive link 272 is secured to the other end of the yoke 266 through a pin 274. The drive link 272 is driven by a cam 279 on the power shaft 66 (FIG. 2).

A collar 276 with a threaded bore engages the threaded end 260 of the spline shaft 258 and supports four support plates 278 (only two of which are shown in FIG. 9). Each support plate 278 has a slot 279 which engages the pin 282 of a plunger 280. The plunger 280 reciprocates within the guide member 236 and passes through the cap guide opening 256 when it is extended into the lower position as illustrated in FIG. 9. A connecting member 281 joins the plunger 280 with the cam member 254 so that the cam member 254 reciprocates vertically with the plunger 280.

The caps 48 are fed from a cap orienting and feed mechanism 286 through an upper cap tube 284 which is telescopingly received in the lower hollow cap tube 240. The cap orienting and feeding mechanism 286 can be any suitable device which orients the caps with the heads upwardly and the wire receiving openings downwardly as illustrated in FIG. 9. Such a device is currently available from Feedmatic-Detroit, Inc., of Southfield, Mich.

Each of the cap feeding mechanisms operate as follows, it being understood that each mechanism operates simultaneously to put a cap on each end of the U-shaped wires 34. The spline shaft 258 is reciprocated by the drive link 272 through the yoke 266. Reciprocation of the spline shaft 258 drives the plunger 280 by virtue of the connection between the plunger 280 and the threaded collar 276. As the plunger reciprocates, the cam 254 also reciprocates thereby causing lateral reciprocation of the cap positioning block 242. When the plunger 280 is raised, thereby raising the cam member 254, the cap positioning block 242 is moved to the right as viewed in FIG. 9 so that the cap guide opening 256 is positioned directly beneath the hollow tube 240. In this position, a cap 48 will drop into the opening 256. As the plunger starts its downward movement, the cap in the guide opening will be moved to the left as viewed in FIG. 9 to position the cap directly over the end of the U-shaped rod 34. As the plunger 280 continues downward movement, it will force the cap 48 onto the end of the U-shaped wire 34. Since all of the operations take place simultaneously, there will be no imbalance to the U-shaped wires within the holding and forming die 30.

The size requirements of the high chair varies. Accordingly, there are different lengths of the U-shaped wires 34 which may be positioned beneath the cap feeding mechanism. It is therefore necessary to adjust the feeding mechanism from time to time to accomodate different lengths of wires. In order to accomplish this function, the spline shaft 262 is rotated about its longitudinal axis, thereby causing a corresponding vertical movement of the collar 276 because of the threaded relationship between the collar 276 and the spline shaft 258. As the collar moves downwardly with respect to the shaft 258, the plunger 280 and the cam member 254 will also move downwardly. Simultaneously therewith, the guide support shaft 224 will rotate with the spline shaft 258 because of the nature of the slidable connection between these two members as illustrated in FIG. 9A. Rotation of shaft 224 will move the collar 230 upwardly or downwardly with respect to the shaft 224 depending on the direction of rotation. The threads of the shaft 224 correspond with the threads of the spline shaft 258 so that the collar 230 moves in the same direction as the collar 276. Assuming that the spline shaft 258 is rotated so as to move the collars 230 and 276 downwardly, the guide 236 is also moved downwardly, thereby moving the cam member 254 downwardly a corresponding distance. Note that the side guide members 220 and the guide member 236 are pitched at an angle which corresponds with the angle of each of the lengths of the U-shaped wires 34. Thus, as the capping mechanism is moved downwardly, it will be moved inwardly in alignment with the shorter lengths of the wires 34.

Thus, the capping mechanism can be easily adjusted for larger or smaller high chairs by simply rotating the spline shaft 258.

Toe Bending Mechanism

Figure 10:
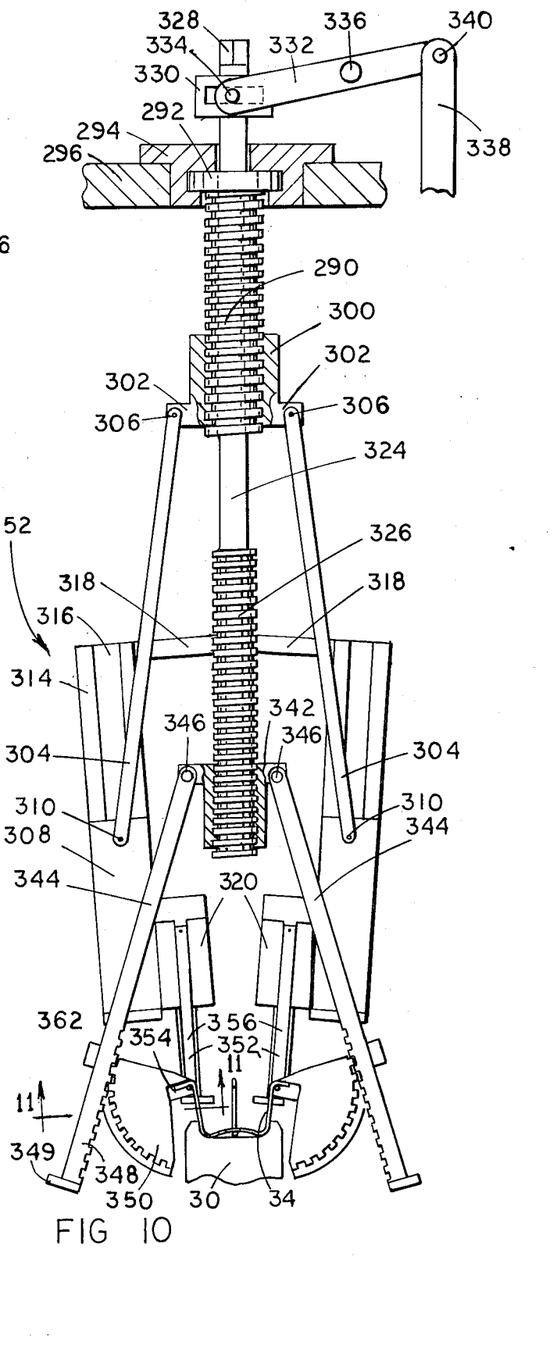
FIG. 10 is an enlarged front view of the mechanism for bending the ends of the wires.

Reference is now made to FIGS. 10, 10A, 11 and 11A, for a description of the toe bending mechanism. A threaded support shaft 290 has a ring 292 fixed to the upper portion thereof. A support collar 294 fixed to a fixed support member 296 rotatably supports the shaft 290 through the ring 292. A collar 300 having a threaded bore threadably engages the support shaft 290. The collar 300 has four projections 302, each one for a separate toe bending mechanism. For purposes of simplicity, only two such mechanisms are shown in FIG. 10. However, one toe bending mechanism is required for each of the ends of the U-shaped wires 34. For purposes of brevity, only one such mechanism will be described with reference to the drawings, it being understood that the other three mechanisms are identical and function identically.

A link 304 is pivotably connected to the projection 302 by a pin 306 at one end and at the other end is pivotably connected to a guide plate 308 by a pin 310. The guide plate 308 has a key 312 projecting from a bottom portion thereof. The guide plate 308 is slidably supported on a fixed guide support 314 having a guide slot 316 in which the key 312 slides. A fixed support bracket 318 supports the guide support 314.

The guide plate 308 has at one side thereof a pair of upstanding guide plates 320 forming a guide 322. In addition, the plate 308 has a longitudinal slot 323 at a central bottom portion of the guide 322.

A spline shaft 324 having a square cross-section is slidably mounted within a square bore of the threaded support shaft 290 in a manner similar to spline 258 in the shaft 224 (see FIG. 9A). The spline shaft 324 has a lower threaded end 326 and a square upper end 328 for gripping by a wrench or similar instrument. A ring 330 rotatably supports the spline 324 in a manner similar to spline 258 in ring 264 (FIG. 9C). The ring 330 is supported by a yoke 332 on pins 334. The yoke is pivotally mounted on pivot pin 336 and pivotally engages at the other end a drive link 338 by a pin 340. A cam (not shown) or other suitable drive mechanism reciprocates the link 338 to pivot yoke 332 and reciprocate the spline shaft 324 in synchronism to the other moving parts of the apparatus.

A collar 342 having a threaded bore threadably engages the threaded end 326 of the spline shaft 324. Linkages 344 are secured to the collar 342 through pins 346. The linkages 344 have a rack 348 at a bottom portion thereof for engaging an arcuate cam member 350. An abutment 349 extends outwardly of the linkage 344.

The arcuate cam member 350 is supported by a slide member 356 through an annular bearing 357. A bending pin 352 extends upwardly through the annular bearing 357 and forms a bending guide for the ends of the wires 34. The slide members 356 have a pair of ears which slide within the guide 322 of the guide plate 308. A pin 358 extends down from the slide member 356 and into the slot 323 of the guide plate 308 to limit the movement of the slide member 356 with respect to the guide plate 308.

Figure 10A:
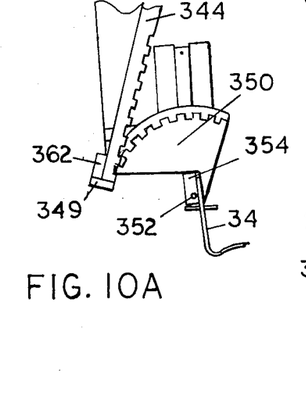
FIG. 10A is a partial view of the mechanism illustrated in FIG. 10 showing a first step in the bending operation.
Figure 11:
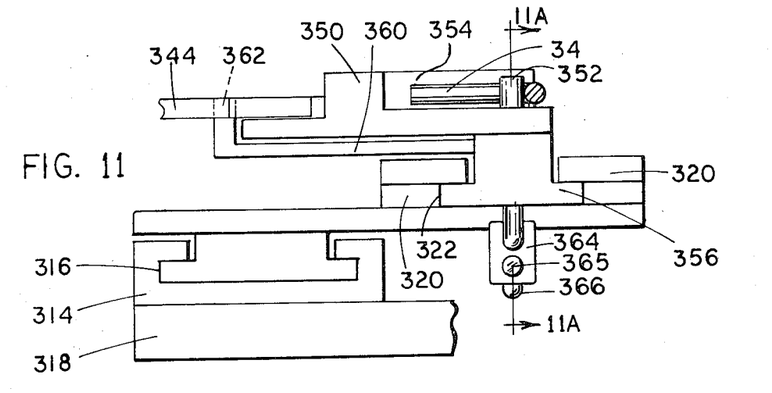
FIG. 11 is a partial sectional view seen along lines 11—11 of FIG. 10.
Figure 11A:
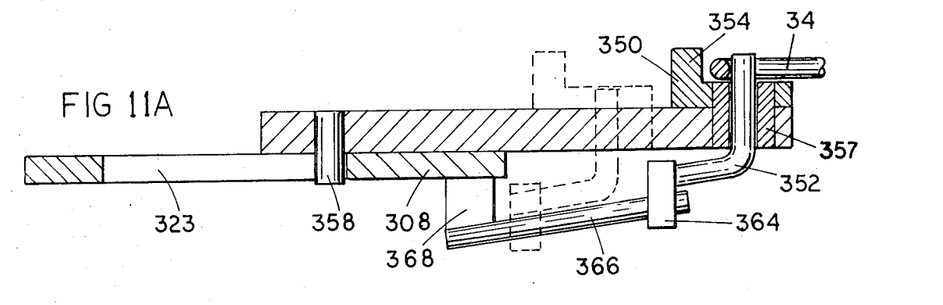
FIG. 11A is a partial sectional view along lines 11A—11A of FIG. 11.

A guide support 360 is mounted on the slide member 356 and extends beneath the arcuate member 350. A retainer 362 extends upwardly from the guide support 360 to retain the rack portion 348 of the linkage 344 against the arcuate gear member 350. In addition, the retainer 362 serves to limit the rearward movement of the link 344 with respect to the slide member 356 by engaging the abutment 349 at the end of the linkage 344 as illustrated in FIG. 10A.

The bending pin 358 is bent backwardly beneath the slide member 356 and has a slide connector 364 connected to the end thereof. An inclined bore 365 in the connector 364 receives an inclined cam rod 366 which is fixed to the bottom of the guide plate 308 through a support member 368.

The toe turning mechanism operates as follows: The U-shaped wires are rotated into position in front of the turning mechanism so that the ends of the rods 34 are positioned in front of the bending indentations 354. Initially, the arcuate member is in the position illustrated in FIG. 10A. The initial position of the bending pin 352 is illustrated in phantom lines in FIG. 11A. The drive link 338 moves rearwardly as viewed in FIG. 10 to drive the spline shaft 324 in a forward direction toward the wires 34. As the spline shaft 324 moves forwardly, the slide member 356 is pushed forward as guided by pin 358 in slot 323. The slide member 356 is moved forward until the pin 358 reaches the end of the slot 323. During this movement, the bending pin 352 is carried forward and raised by the inclined cam rod 366 to the position illustrated by solid lines in FIG. 11A. In addition, the movement of the slide member 356 brings the arcuate gear member 350 forward so that the bending indentation 354 receives the ends of the U-shaped wires 34.

After the pin 358 has reached the end of the slot 323, the spline 324 continues to move forward and, in so doing, drives the linkage 344 to rotate the arcuate gear member 350 about the bearing 357 and about bending pin 352. This rotation of the arcuate member 350 causes the end of the wire 34 to be bent about the bending pin 352, the wire end being retained between the edge of the indentation 354 and the bending pin 352. The ends of the wires are thus bent in this manner by an identical mechanism.

After the bending operation, the drive link 338 is pulled forwardly to pull the spline shaft 324 away from the holding die 30. This movement of the spline shaft, reverses the operation described above. First, the arcuate member 350 is rotated back to its initial position as illustrated in FIG. 10A until the abutment 349 contacts the retainer 362. At this point, further movement of the linkage 344 away from the holding die 30 pulls the entire slide member 356 in the guide 322. The rearward movement of the slide member 356 being limited by pin 358 in slot 323. During this backward movement, the bending pin 352 is drawn downwardly as it is moved backwardly to the position illustrated by the phantom lines in FIG. 11A. The retraction of the pin 352 disengages the end of the wire from the bending mechanism to permit holding die 30 to be rotated with the formed high chair without interference from the bending mechanism.

As has been discussed above, high chairs of different size are formed. Thus, the length of the ends of the U-shaped wire will vary depending on the ultimate size of the high chair. In order to accomodate these different size high chairs, the bending mechanism is adjustable. When it is desirable to adjust the bending mechanism for the different size of the high chairs, the spline shaft 324 is merely rotated about its longitudinal axis with the use of a wrench or like instrument at the square end 328. Rotation of the spline shaft will cause longitudinal movement of the collar 300, thereby moving the guide plate 308 on the guide support 312. Simultaneously therewith, collar 342 will move in the same direction, thereby simultaneously making an equal adjustment between the guide plate 308, the slide member 356, the arcuate gear member 350, and the linkage 344. The pitch of the threads on the spline shaft 324 is the same as that of the support shaft 290 so that rotation of the spline shaft 324 and the support shaft 290 create equal movement of the elements to which they are connected. It should also be noted that the guide supports 314 mount the guide plates 308 at an angle to the spline shaft so that as the adjustments are made, they automatically compensate for the different spread between the ends of the wires 34 for different sizes. For example, the longer high chairs will have a larger spread between them and the bending mechanisms will be spread further apart.

High Chair Removing Apparatus

Figures 12, 12A:
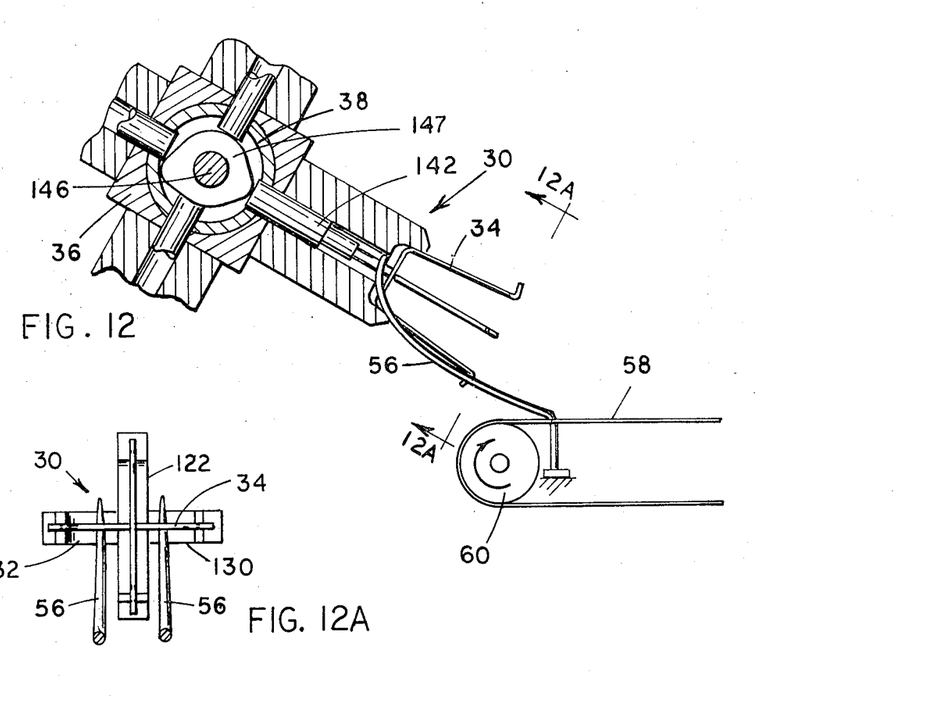
FIG. 12 is an enlarged schematic representation illustrating the manner in which the finished high chairs are ejected from the holding die.
FIG. 12A is a partial sectional view along lines 12A—12A of FIG. 12.

Reference is now made to FIGS. 12 and 12A for a description of the manner in which the high chairs are removed from the holding dies. The removal apparatus comprises a pair of rails 56 which extend upwardly at an angle toward the holding dies 130. The ends of the rails are position to ride beneath one of the U-shaped wires 34 on either side of plate 122 as the holding die 30 rotates from the toe bending station 50 to the bending station 24. The stationary cam 147 has a cam lobe positioned between the toe bending station and the bending station 24 so that the push rod 142 is pushed outwardly against the wires 34 during the rotation of the die 30 from the toe bending station 50 to the bending station 24. This outward movement of the wires 34 permits the rails 56 to be inserted between the holding die and the wires 34. Thus, as the die 30 continues to rotate, the high chair is wedged or pulled from the die 30 by the rails 56. The high chair then slides down the rails 56 onto the conveyor 58 and is carried away.

Cooling Operation

Figure 13:
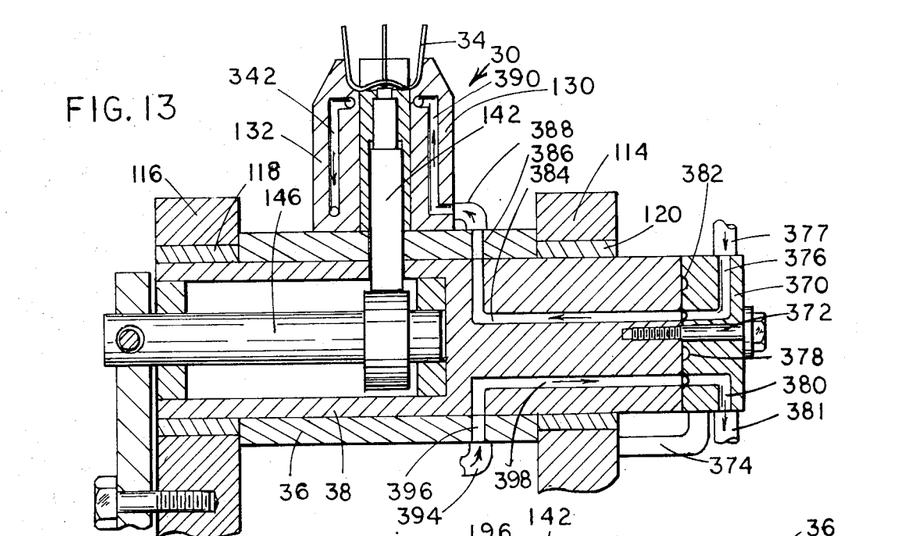
FIG. 13 is a sectional view of the support shaft illustrating a cooling system for the holding dies.

Reference is now made to FIG. 13 which illustrates the manner in which the holding dies can be cooled to prevent build up of excessive heat. The welding operation is a heat producing operation which can cause build up of heat within the dies. In order to eliminate the heat build up problem, a cooling system illustrated in FIG. 13 has been devised. The cooling system comprises an end plate 370 which is secured to the rotary shaft 38 by a bolt 372. A brace 374 retains the end plate 370 fixed with respect to the upright member 114. The end plate 370 has an intake bore 376 which communicates with an annular opening 378 between the end plate 370 and the rotary shaft 38. Cooling fluid is supplied to the intake bore 376 through a suitable conduit 377 and the cooling fluid is removed from the exhaust bore 380 through conduit 381.

An axial bore 384 in the rotary shaft 38 communicates with the annular ring 378 at one end and with a bore 386 in the die block 36 at the other end. A connecting tube 388 communicates with the bore 386 at one end and with a bore 390 in side plate 130 of the holding and forming die 30. Similar connecting bores (not shown) are desirably provided in the die plate 122 for reception and transfer of the cooling fluid. The cooling fluid passes through the side plate 132 via bore 392 which is connected by means (not shown) to the bore 390.

Each of the holding and forming dies 30 have similar conduits for serially passing the cooling fluid therethrough. The bore 392 is thus connected to a connecting tube 394 through each of the other holding and forming dies 30. An axial bore 398 in the rotary shaft 38 communicates through bore 390 with the connecting tube 394 and transfers the fluid to the annular ring 382 and to the exhaust conduit 381. Thus the cooling fluid circulates from the fluid supply conduit 377, through the end plate 370, through the bore 384 in the rotary shaft 38, through each of the holding dies 30. The cooling fluid is returned through bore 398, bore 380 and exhaust conduit 381.

Indexing Operation

Figure 14:
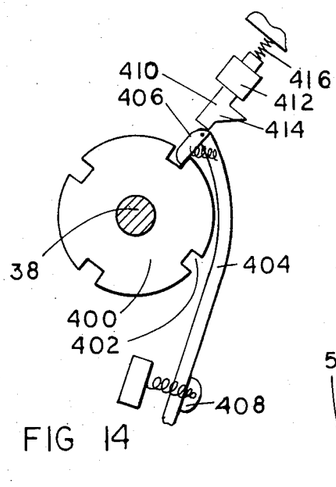
FIG. 14 is a partial side view along lines 14—14 of FIG. 1 illustrating the indexing mechanism by which the holding dies are moved from one station to the next.

Reference is now made to FIG. 14 which illustrates the manner in which the holding dies can be incrementally indexed from station to station. An index disk 400 is secured by means (not shown) to the rotary shaft 38 and contains a plurality of indentations 402 spaced about the periphery thereof. A curved pull member 404 which is reciprocally actuated by a cam (not shown) has a finger 406 which engages the indentations 402. The pull member 404 is resiliently held in contact with the indexing disk by a biasing member 408 which slides along the pull member 404 as the pull member reciprocates. A latch 410 slides in a guide block 412 and has a cam member 414 extending therefrom. A biasing member 416 biases the latch toward the index disk 400.

The indexing operation works as follows: In the position illustrated in FIG. 14, the pull member 404 is about to commence its downward operation. As it moves downward, it rotates the disk through an angle of about 90°. As soon as the disk begins to rotate, the latch 410 comes down and bears against the peripheral surface of the index cam 400. After the index cam 400 has rotated through an angle of 90°, the latch 410 will drop into the next indentation 402 and thereby prevent further movement of the indexed cam 400. At this point, the rotation of the rotary shaft 38 between stations is complete. The pull member 404 then begins to move upwardly until it reaches the latch 410. At this time, the top portion of the pull member 404 will abut the cam surface 414, thereby raising the latch 410 out of the indentation 402. Upon further movement, the finger 406 will drop into the indentation 402 and the cycle begins again. The top of the pull member 404 will actually move slightly past the next indentation to permit the finger 404 to properly engage the indentation 402.

The apparatus described above provides a means for automatically forming one of two types of high chairs in a rapid manner. The operation is completely automated. Further, the apparatus can be easily adjusted to make high chairs of different size.

As noted above, the capping mechanism 46 is inactive when the toe bending apparatus 52 is active and vice versa. The capping mechanism can be easily deactivated by disabling the main drive mechanism. For example pins 274, or pins 268 can be removed for deactivating the capping mechanism 46. Alternatively, the toe bending apparatus 52 can be deactivated by removing pins 340 or pins 334. Such pins can be held into their respective joints when in use by conventional coder pins (not shown).

Reasonable variation and modification are possible within the scope of the foregoing disclosure, drawings, and appended claims without department from the spirit of the invention.

For example, cam operated or electrically timed air cylinders could be used to operate the functional parts of the apparatus, such parts including the bending mechanism, the indexing mechanism, the capping operation, and the end bending mechanism.

The embodiments of the invention in which an exclusive property or privilege is claimed are defined as follows.

1. An apparatus for forming chair supports for reinforcing rods, said apparatus comprising:
   means for bending a pair of crossed wires into U-shapes, said bending means including a die member having a concave cavity for retaining said U-shaped wires, crossed at the bight portions thereof;
   welding means including a welding electrode for welding said U-shaped wires together at said crossed bight portions while said wires are positioned within said die member cavity;
   means for applying caps to the end of said U-shaped wires within said die member cavity; and
   means for moving said die member containing said U-shaped wires into operative relationship with said welding means and said cap applying means, whereby said wires are welded together at the bight portions and have caps applied to the ends thereof while retained in said die member.

2. An apparatus according to claim 1 and further comprising means for removing said welded and capped wires from said die member.

3. An apparatus according to claim 2 wherein said removal means comprises means for pushing said welded and capped wires out from contact with the bottom of said die members, and rail members positioned to project between said bottom of said die member and said wires for pulling said wires out of said die member.

4. An apparatus according to claim 1 wherein said forming means includes a plunger for forcing said wires into said concave die member, said plunger having at its outer end a pusher means bearing against said wires, and means for forcing said pusher means against said wires as said plunger is withdrawn from said cavity to thereby retain said wires within said cavity.

5. An apparatus according to claim 4 wherein said plunger is formed in two sections, and further comprising means for spreading said two sections apart after said plunger is withdrawn from said concave die member to permit passage of the end of one of said U-shaped members between said plunger sections as said concave die member is moved to said welding means.

6. An apparatus according to claim 1 and further comprising means to cut off segments of wire at said bending means to provide said pair of crossed wires.

7. An apparatus according to claim 6 and further comprising means for adjusting said wire cut off means so that the length of wire fed to said bending means can be varied.

8. An apparatus according to claim 1 and further comprising means for bending the ends of said wires backwardly, said moving means moving said die member into operative relationship with said end bending means, means for inactivating said bending means when said caps applying means is operating; and means for inactivating said caps applying means when said end bending means is operative.

9. An apparatus according to claim 8 wherein said end bending means comprises:
   a bending member having an indentation for receiving an end of one of said U-shaped wires;
   means for mounting said bending member for movement toward and away from said end of said one U-shaped wire;
   an upstanding bending pin in said indentation, forming a guide with an edge of said indentation for said end of said one U-shaped wire;
   means mounting said bending pin for retraction beneath said indentation as said bending member is withdrawn away from said end of said one U-shaped wire; and
   means for rotating said bending member about said bending pin when said bending member is in its forward position with said end of said one U-shaped wire between said pin and said edge of said bending member, thereby bending said wire end about said bending pin.

10. An apparatus according to claim 9 and further including means for adjusting said mounting means so that said bending member can receive and bend the ends of wires of different lengths.

11. An apparatus according to claim 1 and further comprising a plurality of said concave die members and means supporting said dies for rotation about a central axis, whereby a pair of wires can be formed while another pair of wires can be welded, and still another pair of wires can be capped.

12. An apparatus according to claim 1 and further comprising means to push said wires slightly out of said die member cavity when said die member is positioned at said welding means.

13. An apparatus according to claim 12 wherein said wires push means includes a contact member beneath said U-shaped wires at the cross portions thereof, and electrical conducting means extending from said contact member to an exposed position for contact with a ground electrode for said welding means.

14. An apparatus according to claim 12 and further comprising means mounting said welding means for reciprocable movement toward and away from said wires in said die member when said die member is positioned in front of said welding means, and said mounting means including a guide member to move the outer end of said welding means laterally with respect to the direction of movement of said wires to said caps applying means as said welding means is moved away from said die member so that said wires can be moved to said caps applying means without interference from the ends of said welding means.

15. An apparatus according to claim 1 wherein said caps applying means includes: A plunger for forcing said caps onto each of said ends of said wires; means mounting said plunger for reciprocable movement toward and away from the ends of said wires, and means for feeding said caps seriatim to said ends of said wires in position for forcing onto said wire ends by said plunger.

16. An apparatus according to claim 15 wherein said mounting means and said feeding means are adjustable for capping wires of different lengths.

17. An apparatus according to claim 1 and further comprising means for cooling said die members to reduce heat build up due to welding.

18. An apparatus for forming chair supports for reinforcing rods and the like, said apparatus comprising:
means for bending a pair of crossed wires into U-shapes, said bending means including a die member having a concave cavity for retaining said U-shaped wires, crossed at the bight portions thereof;
welding means including a welding electrode for welding said U-shaped wires together at said crossed bight portions while said wires are positioned within said die member;
means for bending the ends of said wires backwardly; and
means for moving said die member containing said U-shaped wires into operative relationship with said welding means and said end bending means, whereby said wires are welded together at the bight portions thereof and have the ends thereof bent backwardly while retained in said die member.

19. An apparatus according to claim 18 wherein said end bending means comprises:
a bending member having an indentation for receiving an end of one of said U-shaped wires;
means for mounting said bending member for movement toward and away from said end of said one U-shaped wire;
an upstanding bending pin in said indentation forming a guide with an edge of said indentation for said end of said U-shaped wire;
means mounting said bending pin for retraction beneath said indentation as said bending member is withdrawn away from said end of said U-shaped wires; and
means for rotating said bending member about said bending pin when said bending member is in its forward position with said end of said one U-shaped wires between said pin and said edge of said bending member, thereby bending said wire end about said bending pin.

20. An apparatus according to claim 19 and further including means for adjusting said mounting means so that said bending member can receive and bend the ends of wires of different lengths.

21. An apparatus according to claim 18 and further comprising a plurality of said concave die members; and means supporting said dies for rotation about a central axis, whereby a pair of wires can be formed into the U-shaped configuration while another pair of said wires can be welded, and still another pair of said wires can have the ends thereof turned upwardly.

* * * * *